(12) United States Patent
Doyle et al.

(10) Patent No.: US 6,595,419 B1
(45) Date of Patent: Jul. 22, 2003

(54) SHIELDED MAGNETIC READING DEVICES

(75) Inventors: Richard Alan Doyle, Cambridge (GB); Michael David Crossfield, West Wickham (GB)

(73) Assignee: Flying Null Limited, Cambridge (GB)

( * ) Notice: Subject to any disclaimer, the term of this patent is extended or adjusted under 35 U.S.C. 154(b) by 0 days.

(21) Appl. No.: 09/869,092

(22) PCT Filed: Dec. 23, 1999

(86) PCT No.: PCT/GB99/04405

§ 371 (c)(1),
(2), (4) Date: Sep. 5, 2001

(87) PCT Pub. No.: WO00/39611

PCT Pub. Date: Jul. 6, 2000

(30) Foreign Application Priority Data

Dec. 23, 1998 (GB) .............................................. 9828605
Jan. 13, 1999 (GB) .............................................. 9900725

(51) Int. Cl.[7] .................................................. G06K 7/08
(52) U.S. Cl. ........................................ 235/449; 235/493
(58) Field of Search ................................. 235/449, 493, 235/380; 360/119, 114.05

(56) References Cited

U.S. PATENT DOCUMENTS

| | | | | | |
|---|---|---|---|---|---|
| 3,964,042 A | * | 6/1976 | Garrott | ........................ | 340/551 |
| 4,004,268 A | * | 1/1977 | Cook | ........................... | 367/67 |
| 4,148,036 A | * | 4/1979 | Miller | ........................ | 343/788 |
| 5,397,985 A | * | 3/1995 | Kennedy | ..................... | 324/221 |
| 5,979,774 A | * | 11/1999 | Urushibata | ................... | 235/493 |
| 6,230,972 B1 | * | 5/2001 | Dames et al. | ................ | 235/449 |

FOREIGN PATENT DOCUMENTS

| | | | | |
|---|---|---|---|---|
| WO | WO 96/31790 | 10/1996 | ......... | G01V/15/00 |
| WO | WO 97/48990 | 12/1997 | ......... | G01V/15/00 |
| WO | WO 9748990 A1 | * 12/1997 | ............ | G01V/3/08 |
| WO | WO 98/15851 | 4/1998 | ............ | G01V/3/10 |

OTHER PUBLICATIONS

International Search Report—4 sheets.

* cited by examiner

*Primary Examiner*—Karl D. Frech
*Assistant Examiner*—Uyen-Chau Le
(74) *Attorney, Agent, or Firm*—Oppenheimer Wolff & Donnelly LLP

(57) ABSTRACT

A detector for reading information stored in a magnetic tag is disclosed, the reader comprising two assemblies of permanent magnets (each containing three magnets) arranged with their magnetic poles in opposition such that the magnetic poles of one triplet are physically opposite the like poles of the other triplet. The magnets are preferably elongate with their long axes being mutually parallel. The two magnet assemblies define between them a gap through which, in use, a tag having magnetic material is passed. Receiver coils are positioned within the gap. The magnet assemblies are preferably rigidly secured within an aluminum housing. Electrostatic screening foils may be placed over the receiver coils.

16 Claims, 2 Drawing Sheets

SHIELDED MAGNETIC READING DEVICES

BACKGROUND OF INVENTION

1. Field of the Invention

This invention relates to magnetic sensing and reading devices and, more particularly, is concerned with detectors (or readers) for reading information stored in magnetic tags or elements.

2. Description of the Related Art

In previous patent applications (GB 9506909.2 and PCT/GB96/00823—published as WO96/31790—and PCT/GB97/01662—published as WO97/48990) we have described novel techniques for spatial magnetic interrogation based on exploiting the behaviour of magnetic materials as they pass through a region of space containing a magnetic null. The disclosures of these documents are incorporated herein by way of reference thereto. In particular, our earlier applications describe how passive tags containing one or more magnetic elements can perform as remotely-readable data carriers, the number and spatial of the elements representing information.

BRIEF SUMMARY OF THE INVENTION

A fundamental aspect of the present invention relies upon the interaction between a magnetically active element, and the magnetic field to which it is subjected. As is well defined in the afore mentioned earlier application, particular use can be made of magnetic fields which contain a "magnetic null". This term is used herein to mean a point, line, plane or volume in space at or within which the component of the magnetic field in a given linear direction is zero.

According to the present invention, there is provided a magnetic reading device for use in reading magnetically coded information carriers including elements having an easy axis of magnetisation, which comprises (1) a plurality of permanent magnets consisting of two assemblies of magnets, wherein said assemblies are disposed so as to face one another, thereby defining a gap through which said magnetically coded information carrier is, in use, passed, (2) receiver coils comprising one or more pairs of coils connected in antiphase, said coils being positioned within said gap, characterised in that:

(i) the two assemblies oppose one another magnetically, in that those magnets which directly face each other, are of the same polarity;

(ii) the magnetic field pattern generated by said plurality of magnets is such that the magnetic polarity or said magnetically coded information carrier reverses as it passes through said magnetic field with the easy axes of magnetisation of the magnetic elements oriented in the direction of travel;

(iii) said receiver coils are arranged so as to detect magnetic dipole radiation emitted by the magnetic material in the course of its passage through the magnetic field.

When the magnetic material crosses through the magnetic field generated by a magnetic reading device of the present invention the magnetic polarity of the material reverses. Magnetic dipole radiation is emitted by the material during this reversal which may then be detected by receiver coils.

In a preferred embodiment of the present invention, the detector comprises two triplets of permanent magnets arranged in magnetic opposition, the space between the magnets defining the spatial region which is in the form of a slot through which the tag, when in use, is passed. The central magnet of each of the triple magnet assemblies is the main field-generating magnet; the magnets which flank the central magnet are subsidiary magnets which serve to modify the overall magnetic field in an advantageous manner.

According to a second aspect of the present invention, there is provided a detector for sensing the presence of a magnetic tag having an axis of easy magnetisation, which comprises (1) an arrangement of six permanent magnets disposed so as to define a gap through which the magnetic tag is, in use, passed, the disposition of said magnet(s) and the resultant magnetic field pattern being such as to cause a change in polarity of the magnetisation of said magnetic tag in the course of its passage through a magnetic null within said spatial region; and (2) receiver coils comprising one or more pair(s) of coils connected in antiphase arrangement, the coils being arranged to detect magnetic dipole radiation emitted by a magnetic tag as it passes through said magnetic null with the easy axis of magnetisation of the tag oriented in the direction of travel, characterised in that:

(1) the arrangement of magnets consists of two assemblies of magnets each of which comprises three elongate magnets placed side by side;

(2) the major axes of all six magnets are mutually parallel;

(3) the two assemblies oppose one another physically, thereby defining said gap through which, in use, the magnetic tag is passed;

(4) the two assemblies oppose one another magnetically in that the physically opposed magnets from each assembly are arranged such that their like poles are directed towards said gap; and (5) said receiver coils are positioned within said gap.

Advantageously, the receiver coils are positioned on the inwardly directed face of the central magnet of each of said assemblies. To provide protection from unwanted environmental influences, the coils are preferably covered by an electrostatic screening layer.

In one embodiment, there are four balanced coils open along an axis perpendicular to the direction of movement of a magnetic tag through said gap.

Preferably, the detector is mounted in a housing which surrounds said two assemblies and provides electrical screening therefor, said housing having a slot which permits access to the gap between the two assemblies of magnets.

As mentioned above, the receiver coil arrangement can consist of 4 balanced coils, open along an axis normal to the tag trajectory. This arrangement of magnets and receiver coils is particularly suited to the non-contact reading of tags containing material of medium or high coercivity or where the field required for saturation (due to shape factors for example) is high. The invention is particularly relevant to the detection of discrete elements made from medium coercivity magnetic media, of the kind commonly used for security purposes in documents such as banknotes and cheques.

BRIEF DESCRIPTION OF SEVERAL VIEWS OF THE DRAWINGS

For a better understanding of this invention, to show how the same may be carried into effect, reference will be made, by way of example, to the accompanying drawings, in which.

DETAILED DESCRIPTION OF THE INVENTION

Figure 1:
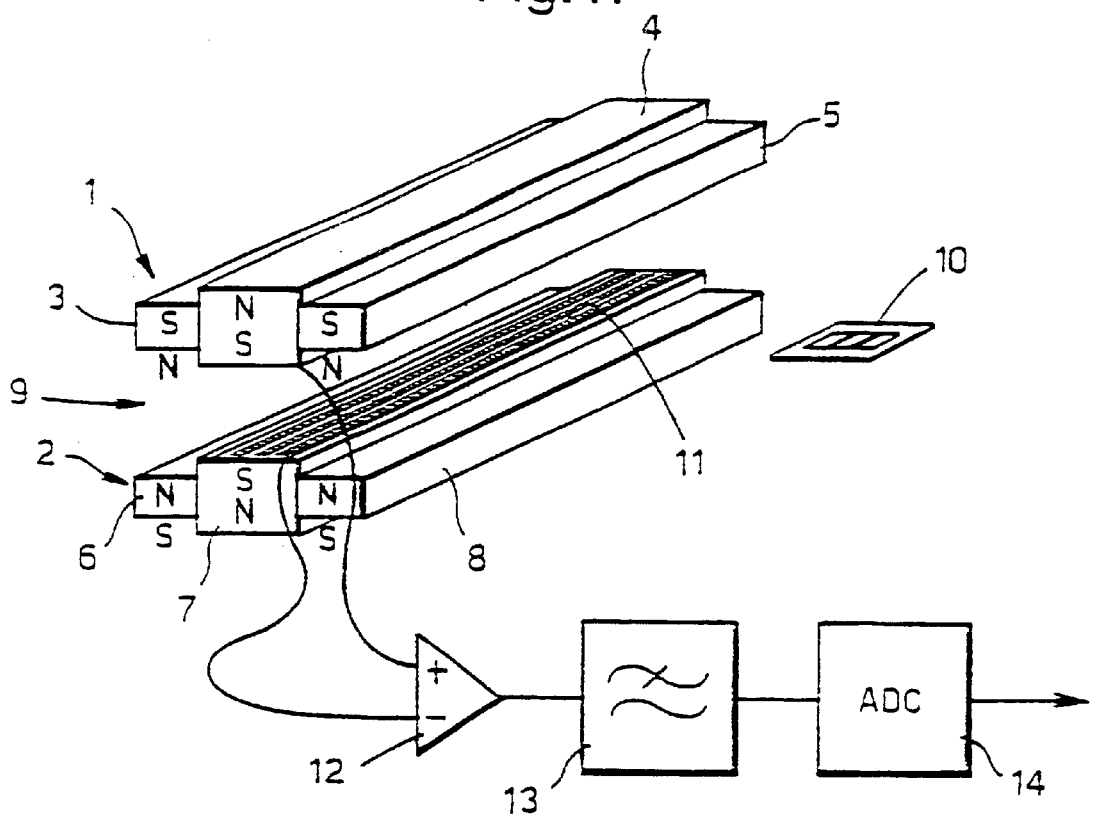
FIG. 1 presents a schematic diagram of a measurement system incorporating a detector in accordance with this invention.

Referring now to the drawings, FIG. 1 shows a preferred arrangement of permanent magnets which generate a dipole field. The arrangement of magnets comprises two assemblies 1 and 2, each comprising three permanent magnets (3,4,5; 6,7,8) which are elongate in form and are arranged side by side; the major axes of all the magnets are mutually parallel, as shown. The magnets are in physical opposition, in that they face one another and define between them a slot-like gap 9 through which, in use, a tag 10 is caused to pass; and they are also in magnetic opposition, in that they are positioned so that both the triplets 1 and 2 have poles N-S-N directed towards gap 9. Thus magnets 3 and 6 have their north poles directed towards one another, as do magnets 5 and 8; while the central magnets 4 and 7 have their south poles directed towards one another.

The central magnets 4, 7 of each triplet assembly are larger than the subsidiary magnets 3,5,6,8. As mentioned above, magnets 4 and 7 are arranged in magnetic opposition to define a quadrupole field through which the tag 10 passes. In addition, the two smaller magnets arranged on each side of each larger magnet have magnetic orientations opposite to that of the larger magnets and therefore also opposite to their opposing partner across the gap 9. Such a magnetic field exhibits a magnetic null, or region of zero magnetic flux, through which the magnetic tag will pass. This field configuration causes the magnetic material in the tag, which has an easy axis of magnetisation, to reverse polarity as it passes through the magnetic null.

A pair of receiver coils connected in anti-phase is mounted on each of the larger magnets; one of these is visible in FIG. 1 and is indicated at 11. The phase of the opposing receiver coils across the gap is also in anti-phase. The coils are wound on formers 2.6 mm wide, 1.6 mm thick and 100 mm long. Each coil contains 60 turns of 0.1 mm wire. This configuration provides good coupling to the magnetic dipole radiation from the tags 10. It also provides a rapid fall off in sensitivity with distance from the coil set. The low level output from the coil is amplified and processed as described in previous patents (see above)— typically utilising an amplifier 12, a low-pass filter 13 and an analogue-to-digital converter 14 as part of the signal processing.

Figure 2:
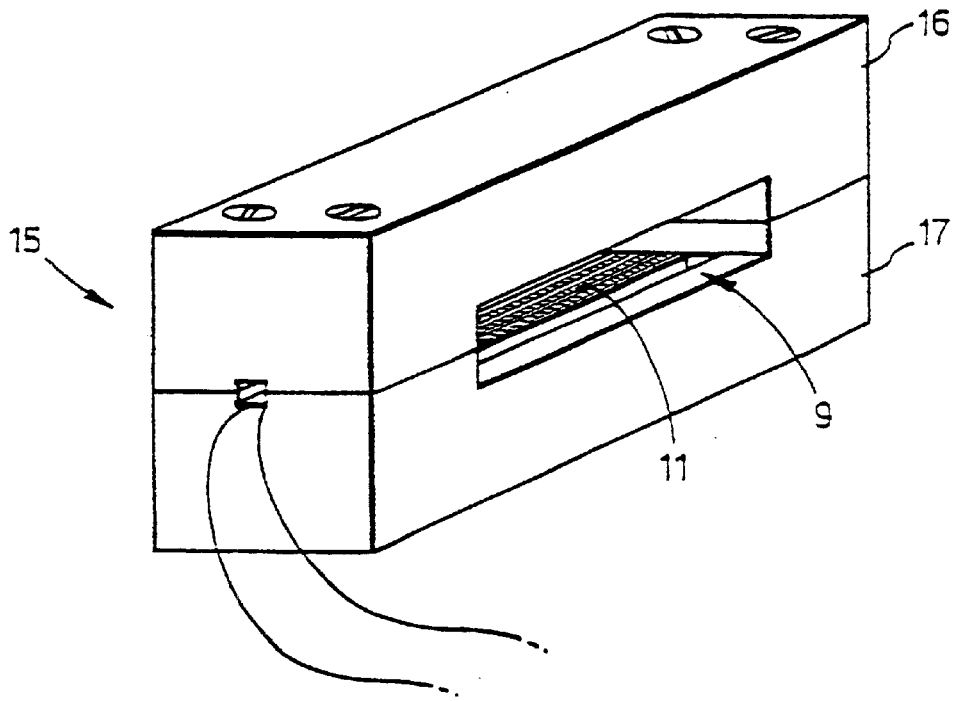
FIG. 2 illustrates the mounting of the magnetic assemblies in a preferred embodiment of the invention.

It is important with the configuration just described to ensure that the structure has adequate mechanical stability, to avoid induced voltage due to movement of the coil(s) relative to the magnets. The construction shown in FIG. 2 (and shown in cross section in more detail in FIG. 4) achieves this and employs a high purity aluminium housing 15 made from two anti-symmetric blocks 16 and 17 into which the magnet triplets are solidly bonded. Close matching of slots milled into the aluminium blocks to the dimensions of the magnets allows an extremely rigid bond of the magnets to be made, constraining their movement in five directions. The strong repulsive forces between the opposing magnets provides a restraining force along the sixth direction.

The effectiveness of the embodiments described above may be increased by attention to specific areas of their construction. These relate for example to the geometry and fabrication of the coils and the design of the magnetic circuit. Performance of these heads is usually limited by two factors in particular:

1) The requirement for insensitivity of the coil system to far-field (ambient) electromagnetic noise sources, this requiring a balanced antenna geometry (quadrupole or higher response);
2) Sensitivity of the system to metal parts moving closeby which experience the stray magnetic field from the head and interact with it, thus coupling into the receive coil set.

Figure 3A:
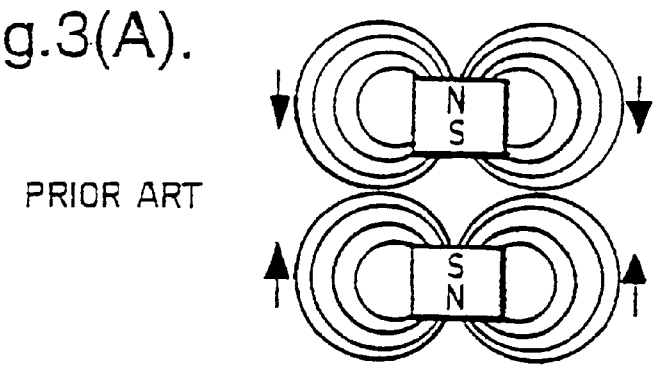
FIG. 3 illustrates the principle by which interference from external moving magnetic parts is minimised in this invention, FIG. 3(a) showing magnetic field lines in a prior art arrangement and FIG. 3(b) showing the filed lines in the present invention.
Figure 3B:
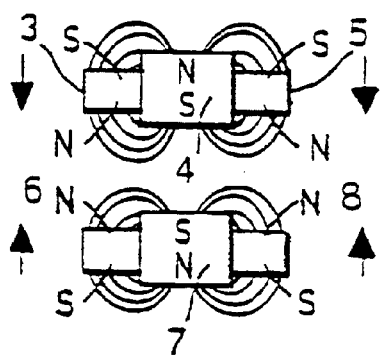

The present embodiment presents several features which are particularly advantageous for avoiding these effects and improving the net performance. FIG. 3(a) shows a schematic diagram of a conventional quadrupole field arrangement set up by two permanent magnets in magnetic opposition. Field lines in the material have to close through free space by looping from north to south poles. Although the magnetic field falls off rapidly away from the pole faces, the return flux path through free space has a finite gradient and measurable fields exist to the edges and rear of the head over distances comparable with the head dimensions. In contrast, FIG. 3(b) shows the magnetic arrangement employed in this invention. Addition of the secondary magnets 3,5,6,8 ensures that a pair of faces of opposite polarity to that of the main magnet (4; 7) are available in close proximity. This dramatically reduces the size of the magnetic return path and enhances the field gradient at the centre of the quadrupole field. The former effect significantly reduces the system sensitivity to moving metal parts because these move in a much smaller magnetic field. The latter effect increases the signal due to the tag and reduces the width of the magnetic footprint.

Figure 4:
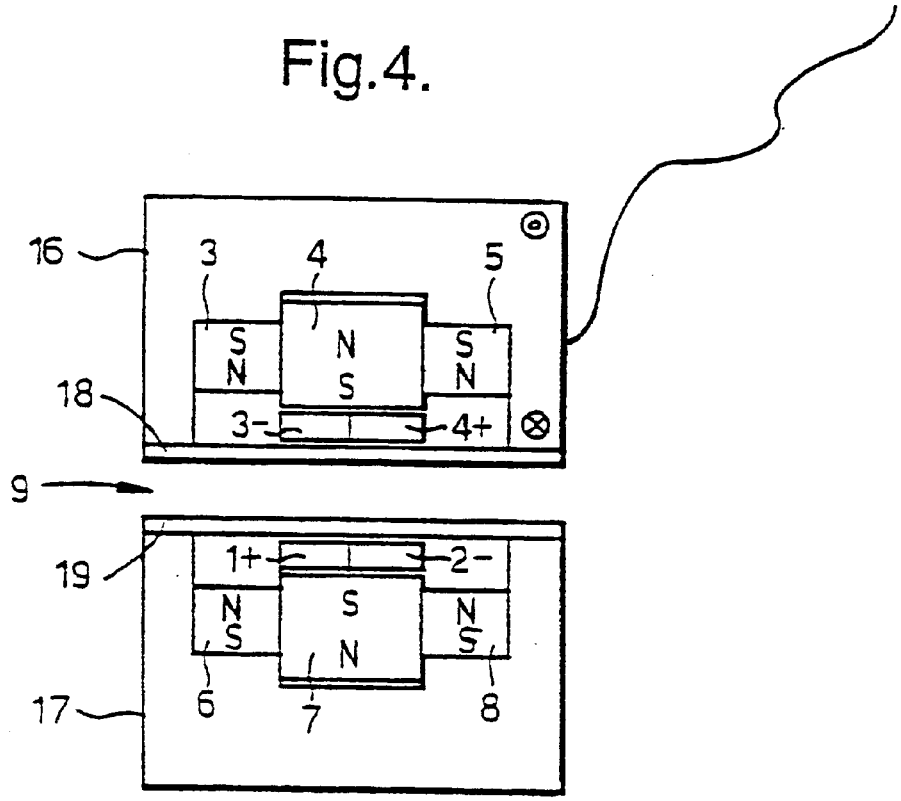
FIG. 4 illustrates the principle by which far-field interference arising from spurious ac-magnetic fields is reduced.

FIG. 4 shows a further advantageous feature of this embodiment of the invention. In allowing for a rigid and vibration-free bonding of the magnets within housing 15, the parts 16 and 17 of the mounting block are also simultaneously closed around the magnet and coil system. This ensures that the coil set is flush with the parts of the mounting block which define the gap 9 through which the tag 10 passes. This minimises collisions between the tag and the coils. However it also has an advantage in respect of assisting in the shielding of far-field electromagnetic interference which has no component aligned along the tag trajectory. All components other than the above induce eddy currents in the aluminium (for which the skin depth in the appropriate bandwidth is much smaller than the block thickness), thus minimising interference in the receiver coils.

Finally, it is also advantageous to shield the receiver coils against electrostatically-coupled interference. This can be easily done by covering them with a conducting layer electrically connected to the electrical ground of the system. Since the skin depth for magnetic signals at the frequencies of interest is typically 1 mm or more in common metals, a very effective electrostatic screen can be made from a thin non-magnetic foil shown at 18 and 19 in FIG. 4. The foil may be formed of, for example, copper or aluminium. In tests a copper foil of thickness 0.1 mm gave very effective electrostatic shielding, and had no measurable effect on the detection of tags containing medium coercivity magnetic elements.

For these tests the foil was attached as indicated in FIG. 4. It was bonded to the aluminium housing parts 16 and 17 using electrically conductive adhesive, and the housing 15 was connected to an electrical earth (not shown).

What is claimed is:

1. A detector for sensing the presence of a magnetic tag having an easy axis of magnetisation, which detector comprises:
   i) two assemblies of permanent magnets, each assembly comprising a central magnet and at least one other secondary magnet disposed either side of the central magnet, the two assemblies being arranged such that each magnet of one assembly directly faces a magnet of the other assembly, thereby defining a gap through which, in use, the magnetic tag is passed with the easy axis of the tag oriented in the direction of travel;
   ii) one or more pair(s) of receiver coils connected in antiphase, the coils being arranged to receive dipole radiation which is emitted by the tag as it is passed through the gap,
      wherein the magnets from each assembly which directly face each other are arranged such that their like poles are directed towards the gap, and wherein the magnetic orientations of the secondary magnets of each assembly are opposite to that of the corresponding central magnet.

2. A detector as claimed in claim 1, wherein each assembly comprises three elongate permanent magnets.

3. A detector as claimed in claim 2, wherein the major axes of all the magnets are mutually parallel.

4. A detector as claimed in claim 3, wherein said receiver coils are positioned on the inwardly directed face of the central magnet of each of said assemblies.

5. A detector as claimed in claim 3, wherein said receiver coils comprise four balanced coils open along an axis perpendicular to the direction of movement of the magnetic tag through said gap.

6. A detector as claimed in claim 3, wherein the detector is mounted in a housing which surrounds the two assemblies and provides electrical screening therefor, said housing having a slot which permits access to the gap between the two assemblies of magnets.

7. A detector as claimed in claim 6, characterised in that said housing is formed of aluminum.

8. A detector as claimed in claim 3, further characterised in that said coils are covered by an electrostatic screening layer.

9. A detector as claimed in claim 8, characterised in that said electrostatic screening layer is a copper foil of 0.1 mm thickness.

10. A detector as claimed in claim 1, wherein the receiver coils are positioned within said gap.

11. A detector as claimed in claim 1, wherein said receiver coils are positioned on the inwardly directed face of the central magnet of each of said assemblies.

12. A detector as claimed in claim 1, wherein said receiver coils comprise four balanced coils open along an axis perpendicular to the direction of movement of the magnetic tag through said gap.

13. A detector as claimed in claim 1 wherein the detector is mounted in a housing which surrounds the two assemblies and provides electrical screening therefor, said housing having a slot which permits access to the gap between the two assemblies of magnets.

14. A detector as claimed in claim 13, characterised in that said housing is formed of aluminium.

15. A detector as claimed in claim 1, further characterised in that said coils are covered by an electrostatic screening layer.

16. A detector as claimed in claim 15, characterised in that said electrostatic screening layer is a copper foil of 0.1 mm thickness.

* * * * *